United States Patent [19]

Harvey

[11] Patent Number: 4,555,122

[45] Date of Patent: Nov. 26, 1985

[54] TRACKING SCOOTER AND THE LIKE AND METHOD OF OPERATION

[76] Inventor: Kenneth C. Harvey, P.O. Box 42, 316 Wilester Lake Rd., West Franklin, N.H. 03235

[21] Appl. No.: 442,320

[22] Filed: Nov. 17, 1982

[51] Int. Cl.⁴ ............................................ B62K 21/00
[52] U.S. Cl. ............................................ 280/87.04 R
[58] Field of Search ................. 280/87.04 R, 87.04 A, 280/87.04 B, 16, 17, 101, 404, 11.23, 47.11

[56] References Cited

U.S. PATENT DOCUMENTS

| | | | |
|---|---|---|---|
| 177,566 | 5/1876 | Saladee | 280/11.23 X |
| 328,510 | 10/1885 | Owsley et al. | 280/11.19 |
| 1,034,625 | 8/1912 | Kohler | 280/11.19 |
| 1,416,613 | 5/1922 | Colardeau | 280/419 |
| 1,483,033 | 5/1924 | Wisman | 280/1.22 |
| 1,755,299 | 4/1930 | Linden | 280/87.04 B |
| 2,162,128 | 6/1939 | Shoemaker | 280/11.19 |
| 2,525,833 | 10/1950 | Schiffbauer | 280/16 |
| 3,023,022 | 2/1962 | Boyden | 280/87.04 |
| 3,203,706 | 8/1965 | Boyden | 280/7.12 |
| 3,228,491 | 11/1966 | Ellerd | 280/410 |
| 3,366,395 | 1/1968 | Bjork | 280/16 |
| 3,442,528 | 5/1969 | Rademacher | 280/87.04 |
| 3,734,538 | 5/1973 | Humes | 280/426 |
| 3,972,540 | 8/1976 | Donaldson | 280/404 |
| 4,123,079 | 10/1978 | Biskup | 280/87.04 A |
| 4,138,128 | 2/1979 | Criss | 280/16 |
| 4,203,610 | 5/1980 | Mihalik | 280/87.04 |
| 4,230,331 | 10/1980 | Johnson | 280/218 |
| 4,244,596 | 1/1981 | Chung | 280/426 |

Primary Examiner—Joseph F. Peters, Jr.
Assistant Examiner—Michael Mar
Attorney, Agent, or Firm—Rines and Rines, Shapiro and Shapiro

[57] ABSTRACT

A novel scooter-like device enables the user to employ body movements similar to those used in skiing to cause the vehicle to traverse hills, including grass-covered slopes, through pivotally, longitudinally and arcuately slidably linking angular movement of the front locomotion mechanism relative to the longitudinal axis of a fixed central platform to the rear locomotion mechanism in tracking relationship, and in a region under the central portion of the platform.

2 Claims, 3 Drawing Figures

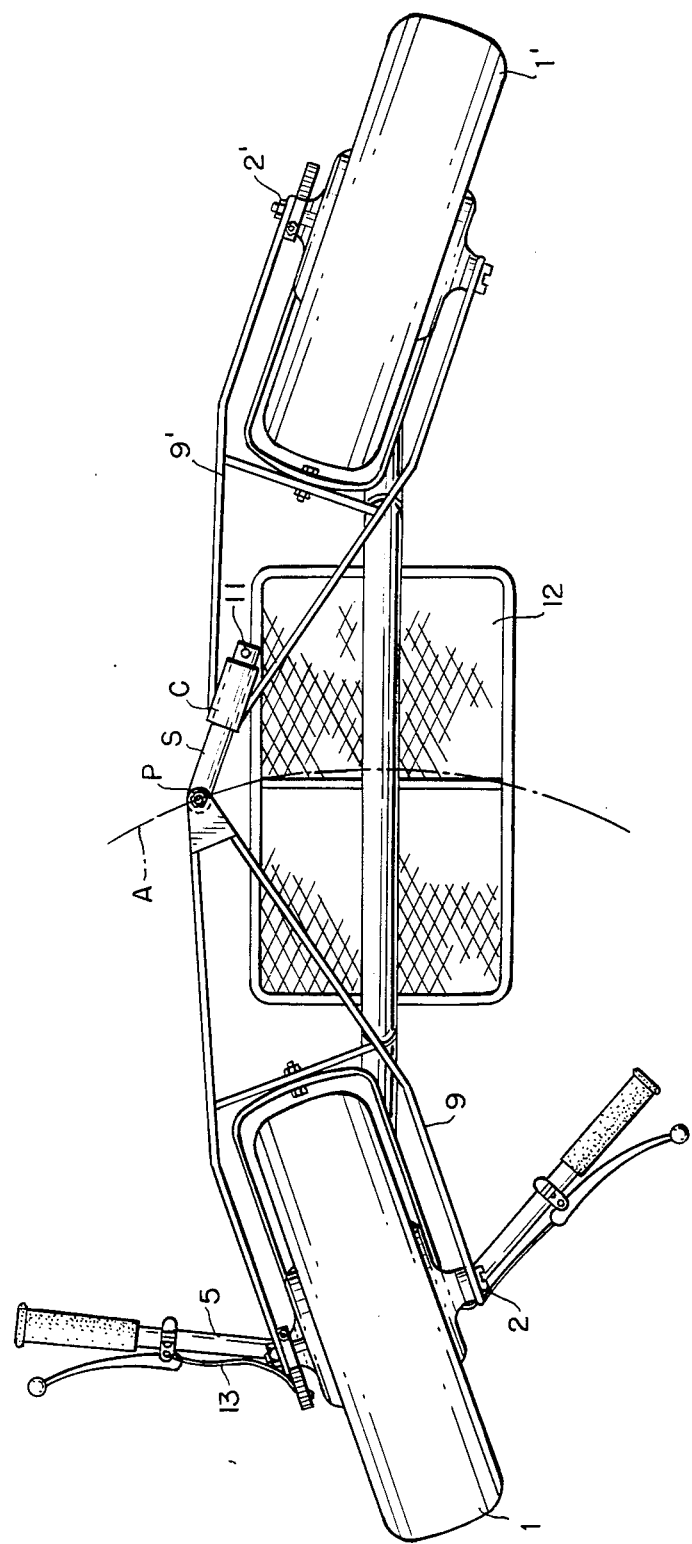

TRACKING SCOOTER AND THE LIKE AND METHOD OF OPERATION

The present invention relates to scooters or similar types of user-propelled vehicles, being more particularly directed to improved scooter-like constructions that enable the user to employ body movements similar to those used in skiing and related sports for causing the vehicle to traverse hills, including grass-covered ski slopes in summer time and the like.

The art is replete with various types of recreational scooter and similar devices including skiboards, skateboards and related apparatus, stimulating the user to develop additional skills to those customarily used in bicycling or ordinary fixed scooter-type operation. In U.S. Pat. No. 1,483,033, for example, a scooter-like device is provided with pivotal sections to simulate the parts of an animal in motion for children. In such a device, the region where the user sits or stands is itself subject to the pivoting action. While perhaps such a construction is satisfactory for the purposes of devices of this character, it is totally unsuited to systems such as contemplated by the present invention wherein the user is to use "body-English" or body orientation from side to side of a longitudinal axis of a fixed central platform in order to complement steering and enable the device to be used somewhat analogously to the back and forth traversals of the skier on skis. Numerous other types of spring-connected or linked roller skates, steering devices for wheels, toys and coasters and sleds have been proposed, but they all are constructed in such a manner as to forbid the type of operation desired in accordance with the present invention. Among such prior devices are those disclosed for example in U.S. Pat. Nos. 328,510; 1,034,625; 1,483,033; 2,162,128; 3,023,022; 3,203,706; 3,228,491; 3,442,528; 4,138,128; 4,203,610; 4,230,331.

Turning to prior trackable steering mechanisms evolved for the steering of large vehicular trailers or the like, again the kinds of previous constructions proposed are not adapted to take advantage of body-English operation of the user, together with the ability to steer, brake and perform the other kinds of operations intended with the invention. Examples of steering mechanisms for such larger vehicles are contained in U.S. Pat. Nos. 1,416,613; 3,734,538; and 4,244,596.

An object of the present invention, accordingly, is to provide a new and improved scooter or the like and more general method of vehicular propulsion which enables the user to complement steering of the front wheel or other propelling mechanism orientation as by applying body English to one side or the other of the device, and automatically to cause linking of that angular orientation to the back wheel or other propelling mechanism in an equal but opposite angular direction such that tracking occurs, and with the user being in a fixed central location intermediate the angular linked orientations of the front and rear propelling mechanisms.

A further object of the invention is to provide a new and improved scooter or other propelling vehicle including ski device and the like of more general applicability as well.

Other and further objects will be explained hereinafter and are more particularly delineated in the appended claims.

In summary, however, from one point of view, the invention embraces a method of propelling a vehicle such as a scooter and the like provided with front and rear propelling mechanisms angularly rotatable about vertical axes forward and rearward of a longitudinally extending central platform, the method comprising, pivotally, longitudinally and arcuately slidably linking angular movement of the front mechanism relative to the longitudinal axis of the central platform to the rear mechanism in a region under the central portion of the platform such that body shifting to the sides of the central platform longitudinal axis as complements steering of the front mechanism, which effects angular orientation of the front mechanism and automatic opposite-direction similar angular orientation of the rear-wheel mechanism in tracking relationship, and with the central platform and user thereupon in fixed position. From an apparatus point of view the invention also contemplates a scooter or the like having, in combination, front and rear wheels angularly rotatable about the vertical axes of their respective supports; a central platform connected between said supports; and forward and rearward horizontal yokes converging from the respective front and rear wheel axles of the front and rear wheels to provide pivotingly sliding joint means disposed substantially centrally under the central platform.

Preferred details and best mode embodiments are hereinafter presented.

The invention will now be described with reference to the accompanying drawings, FIG. 1 of which is a side elevation of a scooter constructed in accordance with a preferred embodiment;

FIG. 3 is a top elevational view illustrating the device in operation.

Figure 1:
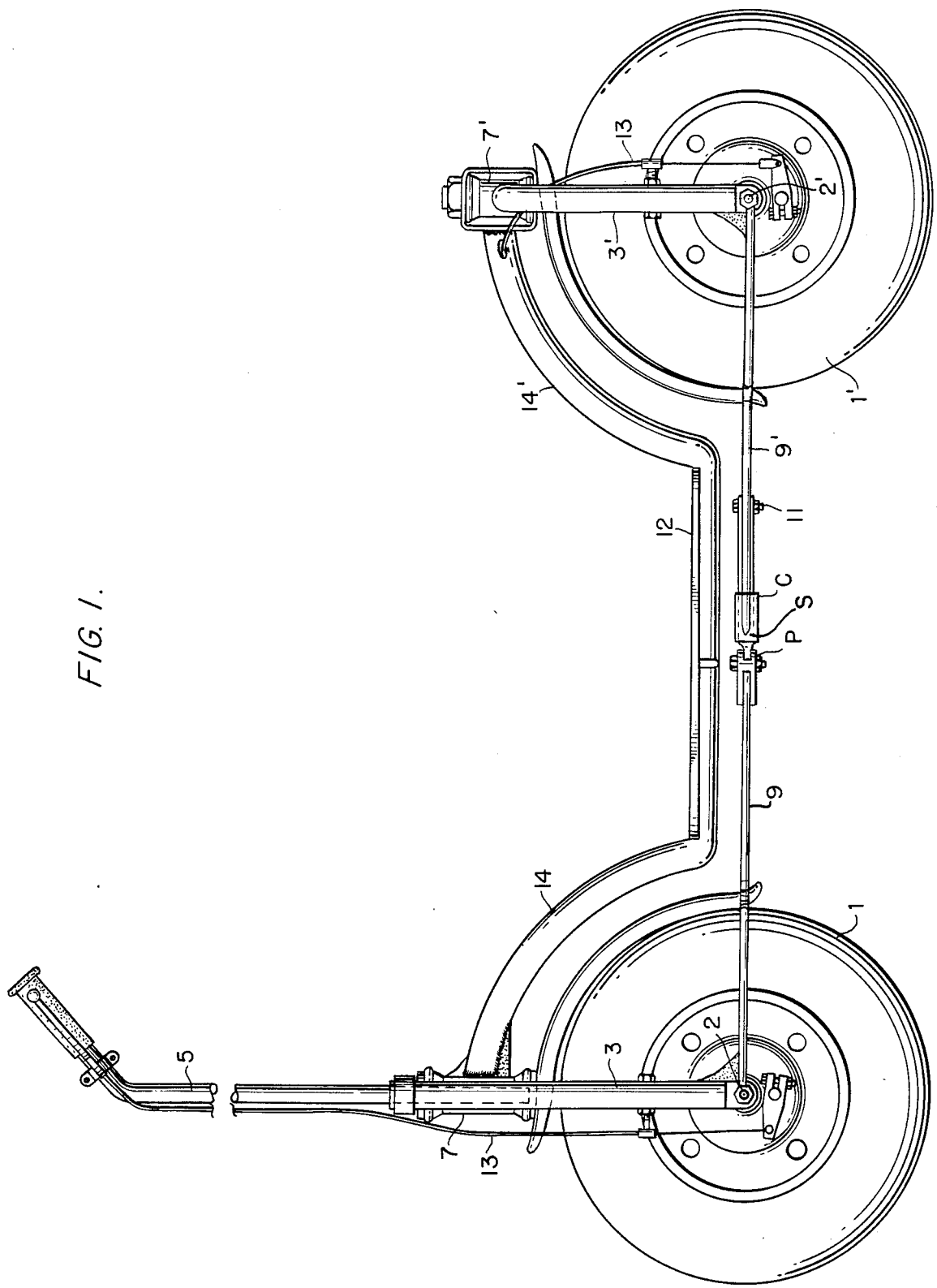
Figure 2:
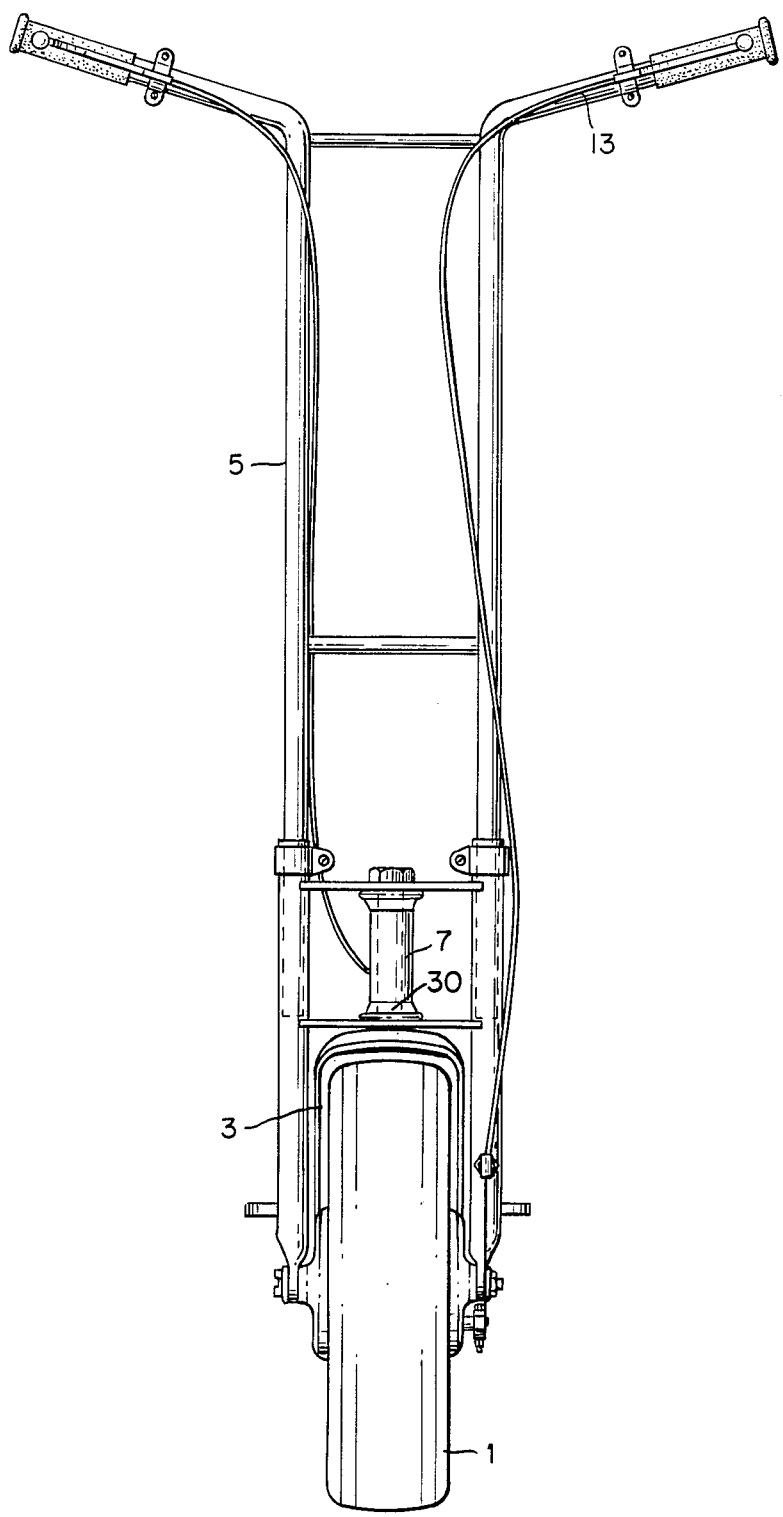
FIG. 2 is a front elevational view of the same.

Referring to FIG. 1, the invention is illustrated as applied to a wheeled scooter having front and rear wheels 1, 1' each rotatable about transverse axles 2 and 2' and supported by respective forward and rearward vertically mounted U-shaped yokes 3 and 3' having the open part of the U receiving and supporting the wheel axles. The forward supporting yoke 3 continues from its upward arcuate construction into steering handlebar mechanisms 5 in rather conventional form, with the yoke 3 mounted with its yoke pin 30 at its upper end rotatable in a journalled cylinder 7. Turning of the handlebars of the upper steering frame 5 will thus cause the wheel 1 and yoke 3 to rotate angularly about the vertical axis passing through the journal 7 and the steering mechanism 5, so that the front wheel 1 may be adjusted at any desired angle to the left or the right of the forward direction of the vehicle by steering the handlebar in rather conventional fashion. The yoke 3' of the rear-wheel 1' is similarly rotatably movable in a journal cylinder 7'.

In accordance with the present invention, the axle 2 also passes through the open ends of a further yoke 9 oriented horizontally rearwardly of the front wheel 1, as distinguished from the vertical orientation of the yoke 3. The horizontal rearwardly extending yoke 9, as more particularly shown in FIG. 3, converges at a point substantially centrally between the axle 2 of the front wheel 1 and the axle 2' of the rear wheel 1' in a pivot mechanism P. Forwardly extending from the rear axle 2' of the rear wheel 1' is a similar horizontal yoke 9' carried by the axle 2' of the rear wheel 1' and converging into a horizontally oriented cylindrical sleeve C receiving a slide cylinder S that is forwardly linked at the pivot region P of the rearwardly extending horizontal yoke 9, and is provided with a stop 11 at its other end to prevent it from sliding out of the sleeve C.

As the front wheel 1 is rotatably angularly positioned, as shown to the left in FIG. 3, the slide cylinder S pivoted at P will slide within the cylinder c, turning the forwardly extending rear horizontal yoke 9' associated with the rear wheel 1' in the opposite angular direction (to the right in this example).

As the forward wheel 1 turns about the vertical axis to an angle with respect to the longitudinal axis of the vehicle, the pivot point P moves to the side of the longitudinal axis depending upon the direction of turn (shown to the right in FIG. 3, with front wheel turning left). The rear wheel horizontal yoke 9', through the action of the sleeve S sliding within the cylinder C, turns to the same angle, but in the opposite direction with respect to the longitudinal axis of the vehicle, thereby tracking the turning of the front wheel.

As illustrated, the tracking function effected by the horizontal yokes 9 and 9' takes place below the central platform 12 of the vehicle which is supported as a rigid integral unit by forward and rearward supporting bar frames 14 and 14'. The supporting bar 14 arcuately rises from the forward end of the central platform 12 to connect with the journal cylinder 7; and the rearward supporting bar 14' similarly connects to the rear journal cylinder 7'. The pivoting-tracking action of the horizontal yokes 9-9' takes place along an arc A, indicated in FIG. 3, substantially centrally under the platform 12.

The great advantage of this type of construction over prior art tracking systems before discussed resides in the fact that in addition to steering with the aid of the conventional handlebar mechanism 5, the user, while fixed with feet on the upper surface of the central platform 12, may apply body English, much as in skiing, leaning the body to the right or the left of the platform and thereby complementing the steering of the front wheel 1, and with the automatic tracking by the rear wheel 1', enabling the very desirable and new results of the present invention to be attained.

While the invention has been described in connection with the particular geometry of horizontal yokes and pivoting mechanisms, it will be clear to those skilled in this art that equivalent types of mechanical structures may also be employed; and also that the tracking construction and concept of the invention with the fixed central platform 12 may be applied to other locomotion mechanisms than wheels, including skis similarly mounted with respect to the yokes. If desired, conventional hand-levered controlled braking cables 13 may be used, as also shown; and the handlebars may be folded downwardly and inwardly for transport.

Further modifications will also occur to those skilled in this art, and such are considered to fall within the spirit and scope of the invention as defined in the appended claims.

What is claimed is:

1. A scooter and the like having, in combination, a longitudinally extending central platform having integrally connected forwardly and rearwardly extending upward arcuate support bars; a forward vertically mounted yoke provided with upper steering means for manual engagement by a user and a lower transverse axle mounting the front wheel and rotatably mounted through the forward end of the forward support bar to enable the steering means to turn the front wheel about the vertical axis of the forward yoke said vertical axis intersecting said axle; a rearward vertically mounted yoke rotatably mounted at its upper end through the rearward end of the rearward support bar and provided at its lower end with a transverse axle mounting the rear wheel, said rearward yoke having a vertical rotational axis that intersects the last-mentioned axle; a forward horizontally mounted yoke connected to the front wheel axle and converging to a pivot point below the central region of the platform; a rearward horizontally mounted yoke connected to the rear wheel axle and converging to a sleeve slidable along a slide cylinder pivoted at said pivot point, wherein steering of the scooter may be achieved by rotation of the steering means by the user for turning the forward vertically mounted yoke, the forward horizontally mounted yoke, and the forward wheel turn about the first-mentioned vertical axis to an angle with respect to the longitudinal axis of the central platform and causing the pivot point to move to the sides of the central platform axis, with the rear wheel yoke sleeve sliding upon the slide cylinder thereby turning the rearward vertically mounted yoke, the rearward horizontally mounted yoke, and the rear wheel about the second-mentioned vertical axis by an equal angle in the opposite direction with respect to the central platform axis.

2. A scooter and the like having, in combination, a longitudinally extending central platform having integrally connected forwardly and rearwardly extending support bars; a forward vertically mounted yoke provided with upper steering means for manual engagement by a user and a lower transverse axle mounting the front wheel and rotatably mounted through the forward end of the forward support bar to enable the steering means to turn the front wheel about the vertical axis of the forward yoke, said vertical axis intersecting said axle; a rearward vertically mounted yoke rotatably mounted at its upper end through the rearward end of the rearward support bar and provided at its lower end with a transverse axle mounting the rear wheel, said rearward yoke having a vertical rotational axis that intersects the last-mentioned axle; a forward horizontally mounted yoke connected to the front wheel axle and converging to a region below the central part of the platform; a rearward horizontally mounted yoke connected to the rear wheel axle and converging to said region, said horizontal yokes being connected at said region by pivoting slide joint means, wherein steering of the scooter may be achieved by rotation of the steering means by the user for turning the forward vertically mounted yoke, the forward horizontally mounted yoke, and the forward wheel about the first-mentioned vertical axis to an angle with respect to the longitudinal axis of the central platform and causing the pivoting slide joint means to move to the sides of the central platform axis, thereby turning the rearward vertically mounted yoke, the rearward horizontally mounted yoke, and the rear wheel about the second-mentioned vertical axis by an equal angle but in the opposite direction with respect to the central platform axis.

* * * * *